United States Patent
Stelter et al.

(10) Patent No.: US 8,220,333 B2
(45) Date of Patent: Jul. 17, 2012

(54) MEASUREMENT DEVICE AND METHOD FOR DIAGNOSIS OF NOISE IN FLUIDIC SYSTEMS

(75) Inventors: Andreas Stelter, Minden (DE); Urs E. Meier, Wuerenlingen (DE); Detlef Pape, Nussbaumen (CH)

(73) Assignee: ABB Technology AG, Zurich (CH)

( * ) Notice: Subject to any disclaimer, the term of this patent is extended or adjusted under 35 U.S.C. 154(b) by 400 days.

(21) Appl. No.: 12/638,564

(22) Filed: Dec. 15, 2009

(65) Prior Publication Data

US 2010/0147079 A1    Jun. 17, 2010

(30) Foreign Application Priority Data

Dec. 15, 2008  (DE) .................. 10 2008 062 291

(51) Int. Cl.
*G01N 29/032* (2006.01)
*G01F 1/22* (2006.01)
(52) U.S. Cl. ....................................... 73/599; 73/861.53
(58) Field of Classification Search .................. 73/599, 73/602, 40.05, 54.25; 381/150
See application file for complete search history.

(56) References Cited

U.S. PATENT DOCUMENTS

| | | | |
|---|---|---|---|
| 3,989,905 A | | 11/1976 | Anderson et al. |
| 4,375,629 A | * | 3/1983 | Howard ......................... 337/159 |
| 4,688,433 A | * | 8/1987 | Silverwater ................ 73/861.53 |
| 4,827,774 A | * | 5/1989 | Silverwater ................ 73/861.53 |
| 5,220,837 A | * | 6/1993 | Silverwater ...................... 73/714 |
| 5,343,757 A | * | 9/1994 | Tate ................................ 73/724 |
| 5,428,984 A | * | 7/1995 | Jones et al. .................... 73/1.73 |
| 5,809,153 A | * | 9/1998 | Aylward et al. ............... 381/337 |

FOREIGN PATENT DOCUMENTS

| | | |
|---|---|---|
| DE | 100 02 826 A1 | 8/2001 |
| EP | 1 052 492 B1 | 11/2000 |
| WO | WO 94/23242 A1 | 10/1994 |

OTHER PUBLICATIONS

Examination Report issued in DE 10 2008 062 291.5-24, Jan. 18, 2010, German Patent and Trademark Office, Munich, DE.

* cited by examiner

*Primary Examiner* — J M Saint Surin
(74) *Attorney, Agent, or Firm* — Buchanan Ingersoll & Rooney PC

(57) ABSTRACT

A measurement device and method for diagnosing noise in fluidic systems. A microphone, which is arranged at least partially in the area of the flow medium, compensates for pressure surges in the flow medium. The microphone receives the noise via a membrane and converts it to an electrical signal for evaluation of the noise source by an electronic diagnosis unit. To compensate for pressure surges in the flow medium, the membrane of the microphone is arranged in a housing, which is open on both sides of the membrane and whose two openings have pressure applied to them by the flow medium as a sound source, with at least one of the two openings being provided, in order to detect noise, with filter means for attenuation and/or time delay of frequencies which are in an expected noise spectrum, while the filter means allows lower frequencies produced by the pressure fluctuations in the flow medium to pass through.

20 Claims, 3 Drawing Sheets

MEASUREMENT DEVICE AND METHOD FOR DIAGNOSIS OF NOISE IN FLUIDIC SYSTEMS

RELATED APPLICATION

This application claims priority under 35 U.S.C. §119 to German Patent Application No. 10 2008 062 291.5 filed in Germany on Dec. 15, 2008, the entire content of which is hereby incorporated by reference in its entirety.

FIELD

The present disclosure relates to a measurement device and method for diagnosing noise in fluidic systems, and more particularly to a measurement device that includes a microphone, which is arranged at least partially in the area of a flow medium, and which receives the noise via a membrane and converts the received noise to an electrical signal for diagnosis.

BACKGROUND INFORMATION

The field of use of various exemplary embodiments of the present disclosure can extend to, for example, fluidic systems such as pipelines or containers through which a flow medium flows and/or in which a flow medium is kept. Both liquids such as water or chemicals or else gases such as compressed air or natural gas may be used as the flow medium.

The flow of fluids such as those in pneumatic and hydraulic systems produces flow noise. Noise can likewise be transmitted into the flow medium from the exterior via the wall of a pipeline or of a container. All these types of noise generally have characteristic properties which can depend on the way in which they are produced, and their cause can therefore be deduced by recording and analysis of such noise, by diagnosis. This makes it possible to determine a specific state of a fluidic system, in that a measured noise can be associated with a specific cause.

Fault states, such as vibration of a pipeline or fluid flowing out, can in particular be detected exactly, thus allowing state diagnosis or fault diagnosis of the system. Alternatively, either the situation in which a noise is present or is not present can be used for diagnosis purposes. For example, if flow noise occurs suddenly in a system which is normally closed, the flow noise can be diagnosed as indicating a leakage.

DE 100 02 826 A1 discloses a measurement device of this generic type for diagnosis of noise in fluidic systems. A microphone which detects noise that is present in the area of a pipeline is used to detect a leakage in the pipeline through which a pressurized flow medium is flowing. This noise is evaluated by an electronic diagnosis unit in such a way that the frequency components of flow noise, which can be distributed uniformly, and possibly the continuous noise which is can be a leakage noise, are determined and evaluated. This type of filtering makes it possible to reliably determine leakage points acoustically. Since the noise is transmitted via the fluid, the measurement of this noise can also be carried out remotely from its point of origin, thus allowing diagnosis remotely from the fault cause.

The sound signals which correspond to the noise in the fluidic system can be recorded by a structure-borne sound microphone which is fitted to the wall of the pipeline or of the container; however, more detailed measurement is possible if the microphone makes direct contact with the flow medium. The pressure fluctuations of the sound signal are thus converted quite directly, by a membrane, to mechanical oscillations of the membrane, and the mechanical oscillations are converted to electrical signals in accordance with various principles. However, due to high sensitivities of membranes, such structure-borne sound microphones can be at the same time subject to the static pressure of the flow medium which can cause failure of the microphone, such as in the event of major pressure fluctuations of the load caused by a change to the flow medium, such as when a pneumatic pressure piston is ventilated and vented. For this reason, the microphones which are of interest in conjunction various exemplary embodiments of the present disclosure make direct contact with the flow media but are configured to withstand structural failures that are common in known structure-born sound microphones. For example, as described in further detail below, exemplary embodiments of the present disclosure provide a measurement device which includes means to compensate for pressure surges of the flow medium.

U.S. Pat. No. 3,989,905 discloses a microphone with shock suppression. A membrane is arranged within a capsule in a microphone housing and converts sound waves which occur from a front face of the microphone to oscillations, and the oscillations are converted to electrical signals by a coil/magnet system. For shock suppression, an acoustic channel is provided in a microphone capsule which connects the rear face of the membrane to the front face. As a result, pressure fluctuations occur at the same time on both sides of the membrane in order not to deflect the latter or to deflect it only to a very minor extent, thus avoiding destruction.

However, the use of a microphone such as this for diagnosis of noise in fluidic systems is actually not feasible simply because of its physical form. Furthermore, miniaturization is complex, thus making installation difficult, for example, in pneumatic lines. In addition, the design does not appear to be sufficiently robust to allow it to withstand high static load changes in a hydraulic system.

SUMMARY

An exemplary embodiment provides a measurement device for diagnosis of noise in fluidic systems. The exemplary measurement device comprises a microphone, which is arranged at least partially in the area of a flow medium and is configured to receive noise via a membrane and convert the received noise to an electrical signal. The microphone comprises a housing which has openings on two opposite sides of the membrane, the two openings of the membrane being configured to have pressure applied thereto by the flow medium as a sound source. At least one of the two openings comprises, to detect noise, filter means for at least one of attenuation and time delay of frequencies which are equal to or greater than a threshold value, and for permitting frequencies which are below the threshold value to pass through the filter means.

An exemplary embodiment provides a method for diagnosis of noise in fluidic systems. The exemplary method comprises arranging a microphone having a membrane and two openings on opposite sides of the membrane at least partially in the area of a flow medium. The exemplary method also comprises, \detecting pressure applied to the openings of the membrane by the flow medium as a sound source, and creating oscillations in the membrane in accordance with the detected pressure. The exemplary method also comprises converting oscillations of the membrane of the microphone to an electrical signal, and at least one of attenuating and time delaying frequencies which are equal to or greater than a threshold value, to detect noise in the flow medium. In addition, the exemplary method comprises permitting frequencies which are below the threshold value to pass, to compensate for pressure surges in the flow medium.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
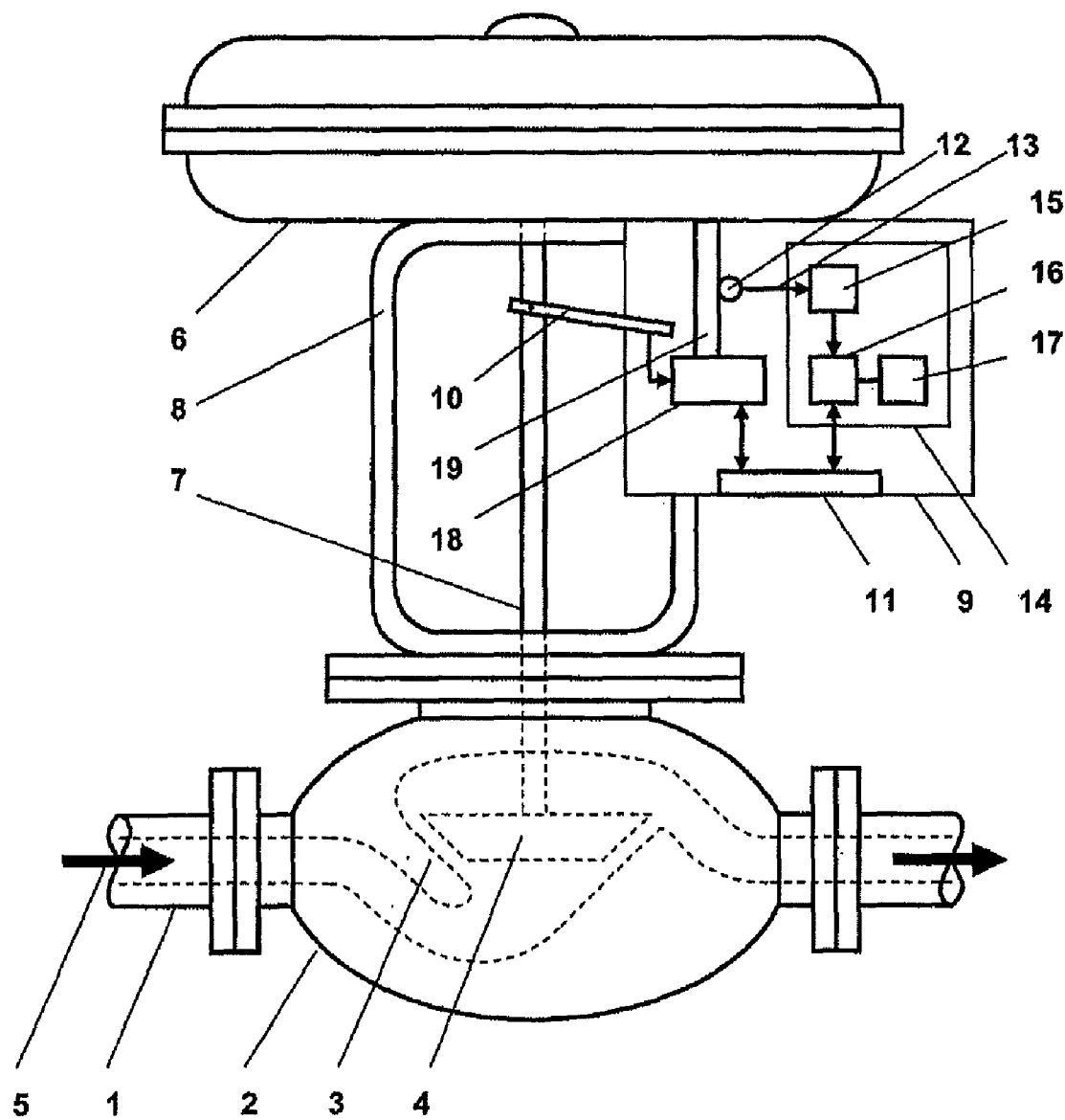
FIG. 1 shows a schematic illustration of an exemplary valve arrangement having a pneumatic actuating drive, according to at least one embodiment.

Exemplary embodiments of the present disclosure provide a measurement device and a method for the diagnosis of noise in the fluidic system. According to an exemplary configuration, the measuring device can include a microphone which is, on the one hand, sufficiently sensitive to reliably detect noise, but, on the other hand, is sufficiently robust to withstand severe pressure fluctuations.

To compensate for pressure surges in the flow medium, exemplary embodiments of the present disclosure provide that the membrane of the microphone can be arranged in a microphone housing which is open on both sides of the membrane (e.g., lateral sides). The two openings have pressure applied to them by the flow medium as a sound source, with at least one of the two openings being provided, in order to detect noise, with filter means for at least one of attenuation and time delay of frequencies which are in or exceed an expected noise spectrum, while contemporaneously allowing frequencies below a threshold to pass through. For example, the frequencies that are in or exceed an expected noise spectrum can be in a noise spectrum which is at a higher relative frequency and is produced by pressure fluctuations in the flow medium, while in contrast the filter means allow the lower frequencies, which are produced by the pressure fluctuations in the flow medium, to pass through.

Accordingly, exemplary embodiments of the present disclosure provide that a specific microphone is used, which has a microphone housing that is open on both sides. The forces on the two sides of the membrane can be equalized immediately by the pressure that is thus applied to both sides of the membrane, and the membrane is not destroyed even in the event of major pressure fluctuations in the fluidic system. In this case, the openings on both sides can be designed such that the pressure fluctuations which occur in the fluidic system act on the membrane without any time delay and different attenuation. According to an exemplary implementation, to allow noise, which is in general in a higher frequency range than the pressure fluctuations in the fluidic system, to be measured, at least one of the openings can have associated filter means which allow low-frequency signals, such as those frequencies associated with pressure fluctuations, to pass through without attenuation and without any time delay, while at the same time attenuating and/or applying a time delay to higher-frequency signals or signals in a specific noise frequency range, such as those being greater than or equal to a threshold frequency value. These higher-frequency signals, or signals which are in a desired noise frequency range, can thus be attenuated and/or have a time delay on one side of the membrane. This results in the following difference signal:

$$\Delta p = p_1(t) - p_2(t),$$

which can be measured with high sensitivity.

When a time delay has been produced, the delay can be set such that the desired noise frequency range occurs precisely with a phase shift of p on the opposite membrane side. This would even lead to doubling of the sensitivity in comparison to a standard microphone.

The filter means which are used to attenuate or delay the time of frequencies which are in an expected noise spectrum and are at a relatively high frequency in comparison to those produced by pressure fluctuations in the flow medium can be designed in various ways, as explained in more detail below with reference to the exemplary embodiments illustrated in the drawings. Exemplary embodiments are described individually below. However, it is to be understood that various features of the exemplary embodiments can be combined in whole or in part to achieve the advantageous effects of the present disclosure.

According to an exemplary embodiment, the filter means can be constituted by aligning the first opening in the microphone housing toward the sound source, and by aligning the second opening in substantially an opposite direction, to achieve a propagation time delay and/or attenuation of the sound on the side of the membrane which is associated with the second opening. In this case, the microphone housing can be designed such that an appropriate length is achieved, or the openings are lengthened by upstream channels or tubes, for example.

Another exemplary embodiment provides that the filter means can be constituted by a diameter difference of the openings, in that the diameter of the second opening is less than the diameter of the first opening. The different cross-section of the openings results in the desired filter effect since higher-frequency signals are attenuated, and also delayed in time, to a major extent by small cross-sections. If the cross-sections differ, then the signals on the two sides of the membrane are attenuated or delayed in time to different extents. This particularly affects higher-frequency signals, while in contrast lower-frequency signals are scarcely influenced. This effect is considerably amplified by the upstream provision of the channels or tubes mentioned above before the openings. The longer the channel is, the more considerable is the effect.

Another exemplary embodiment provides that the filter means can be constituted by channels of different length, which are positioned upstream of the respective adjacently arranged openings. The different channel lengths result in the signals being subjected to a different propagation time delay, which can be set so as to achieve an optimum time shift of p for a specific frequency range. Channels of different length which are associated with these two openings can be used to flexibly match the installed position of the microphone housing to the profile of an existing pipeline or the installed position of a container. In addition, the channels of different length may also be provided with different channel cross sections.

An additional exemplary embodiment provides that a projecting channel, such as the channel that is longer than the other channel, for example, can have soft wall cladding applied to it in order to produce effective amplification in terms of additional attenuation for high frequencies. By way of example, hard foam materials, flexible elastomer materials and the like may be used as a suitable damping material.

According to another exemplary embodiment, the filter means can be constituted by a sound attenuator element which is inserted into one of the two openings. A sound attenuator element such as this absorbs high frequencies by means of the cell structure and the choice of material. Fine-pore sound attenuation materials are particularly suitable for this purpose.

FIG. 1 shows a schematic illustration of an exemplary valve arrangement having a pneumatic actuating drive, according to at least one embodiment. As illustrated in FIG. 1, a process valve 2 is installed in a pipeline 1 (a fragmented view of the pipeline 1 is indicated) of a process installation. In its interior, the process valve 2 has a closure body 4, which interacts with a valve seat 3 in order to control the amount of process medium 5 passing through the process valve 2. The closure body 4 is operated linearly by an actuating drive 6 via a push (valve) rod 7. The actuating drive 6 is connected to the process valve 2 via a yoke 8. A position regulator 9 is fitted to the yoke 8. The travel (i.e., movement) of the push rod 7 is signaled to the position regulator 9 via a position sensor 10, which senses displacement of the push rod 7. The recorded travel is compared in a regulation unit 18 with a nominal value supplied via a fieldbus interface 11, and the actuating drive 6 is operated as a function of the determined regulation discrepancy between the nominal value and the recorded travel as determined in the regulation unit 18. The regulation unit 18 of the position regulator 9 has an I/P converter for conversion of an electrical regulation discrepancy to an adequate control pressure. The I/P converter of the regulation unit 18 is connected to the actuating drive 6 via a pressure medium supply 19.

A microphone 12 is arranged in the pressure medium supply 19 of the actuating drive 6. The acoustic measurement signal 13 from the microphone 12 is received by a signal detection device 15, and is evaluated in a downstream signal processing device 16. The signal processing device 16 has an associated memory device 17. Furthermore, the signal processing device 16 is connected to the fieldbus interface 11 in order to report the diagnosis result to a superordinate device, which can be external to the housing of the position regulator 9.

During normal use, the process valve 2 is caused to oscillate, depending on its operating state. The excitations may have different causes, as mentioned initially, and lead to sound phenomena in different frequency ranges. For example, sound signals in the region of a few kilohertz can be an indication of a leakage, while low-frequency sound signals can be an indication of vibration of the process valve 2.

These sound signals propagate in the process valve 2 and are fed back into the pressure medium system 19 of the actuating drive 6 via the elements which are directly connected to the process valve 2. In this case, the acoustic signals are transmitted primarily via the valve rod 7 to the membrane in the actuating drive 6 and into the housing of the actuating drive 6, which amplify these signals in a similar manner to a large loudspeaker membrane, and pass them on to the pressure medium.

Particularly within the actuating drive 6, for example, major amplification of the acoustic signal in this case can occur, into the pressure medium in the drive chamber.

In this case, the sound signals can also propagate into the pressure medium supply 19 between the I/P converter of the regulation unit 18 and the actuating drive 6. The sound signals are received here by the microphone 12.

Figure 2:
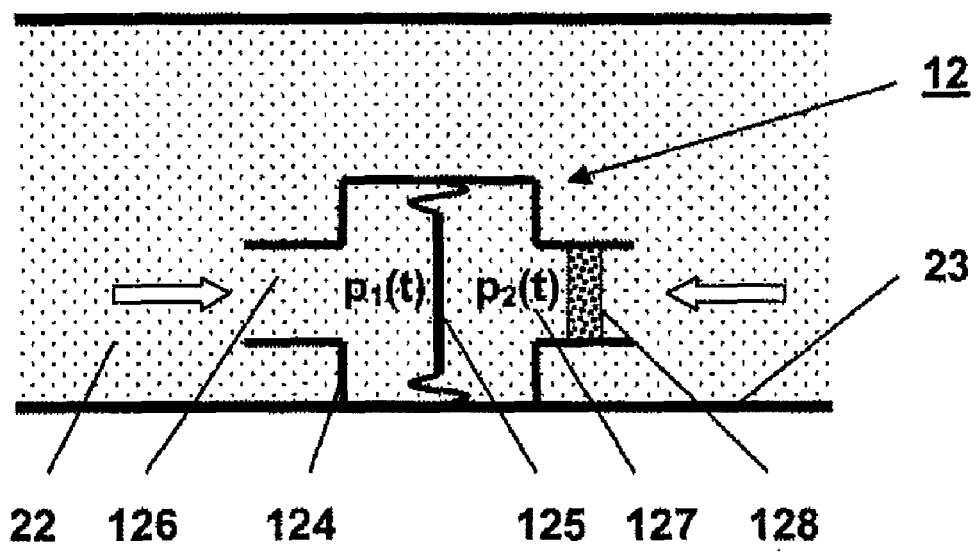
FIG. 2 shows an outline side view of an exemplary measurement device for diagnosis of noise in fluidic systems, according to a first exemplary embodiment.

FIG. 2 shows an outline side view of an exemplary measurement device for diagnosis of noise in fluidic systems, according to a first exemplary embodiment. As shown in FIG. 2, a microphone 12 is arranged in the area of a flow medium 22 of a pipeline 23. The microphone 12 can include a tubular microphone housing 124 composed of metal in which a membrane 125 is arranged such that it can oscillate, over the internal cross section of the microphone 12, in order to detect sound waves. The membrane 125 uses electrical transducer means to receive the noise, convert the received noise to an electrical signal, and supply the electrical signal to an electronic diagnosis unit 14 (see FIG. 1), in order to evaluate the noise cause.

In order to compensate for pressure surges which are produced by valve switching processes within the flow medium 22, the microphone housing 124 in which the membrane 125 is arranged is open on both sides. In the example of FIG. 2, the open sides are in the lateral orientation of the housing 124. The flow medium 22 can thus apply pressure to both of the mutually opposite openings 126 and 127, thus resulting in pressure equalization which prevents the membrane 125 from being destroyed. In order to allow noise to be detected despite this acoustic short circuit, one opening 127 is provided with filter means for attenuation and time delay of frequencies which are at a relatively high frequency in comparison to those produced by pressure fluctuations in the flow medium.

In this exemplary embodiment, the filter means is constituted by a sound attenuator element 128 which extends over the entire cross section of the opening 127 and is composed of a porous sound absorption material for high frequencies. According to an exemplary embodiment, the filter means allows for the low frequencies produced by pressure fluctuations in the flow medium 22, for example, to pass through without any impediment, in order to guarantee the desired pressure equalization. The frequency range which is attenuated and delayed in time by the filter means is in an expected (e.g., predetermined) noise spectrum, thus resulting in a pressure $p_1(t)$ in this frequency range on the side of the membrane 125 associated with the opening 126, which pressure $p_1(t)$ is not the same as the pressure $p_2(t)$ on the side of the membrane 125 associated with the opening 127. As a result of these pressure differences, which are in the filtered-out frequency spectrum, on the two sides of the membrane 125, the membrane 125 is caused to oscillate, in order to convert the noise to mechanical oscillations. The mechanical oscillations are then converted to an electrical signal, and are then supplied for evaluation of the cause of the noise to the downstream electronic diagnosis unit 14. As described above, an exemplary mechanism to convert the mechanical oscillations into electrical signals can be a transducer, for example.

Figure 3:
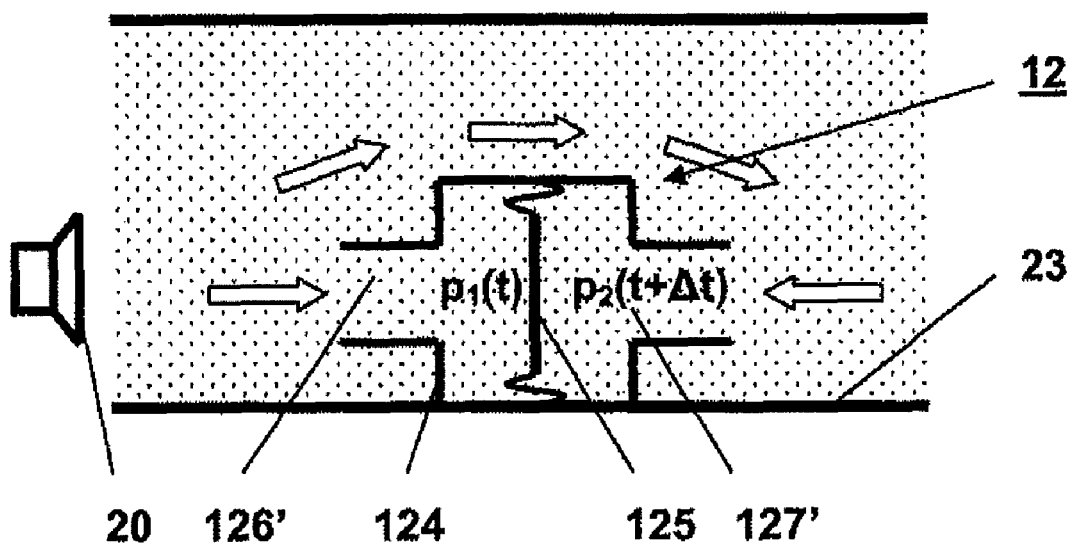
FIG. 3 shows an outline side view of an exemplary measurement device for diagnosis of noise in fluidic systems, according to a second exemplary embodiment.

FIG. 3 shows an outline side view of an exemplary measurement device for diagnosis of noise in fluidic systems, according to a second exemplary embodiment. In the exemplary embodiment illustrated in FIG. 3, the filter means is constituted by the alignment of the first opening 126' in the microphone housing 124 toward the sound source 20, and by the alignment of the second opening 127' in the opposite direction. This results in a propagation time delay of the sound, as indicated by the arrows shown in FIG. 3, on the side of the membrane 125 associated with the second opening 127'. In this case, the sound source 20 corresponds to the direction from which the sound propagating in the flow medium arrives at the microphone 12'.

Figure 4:
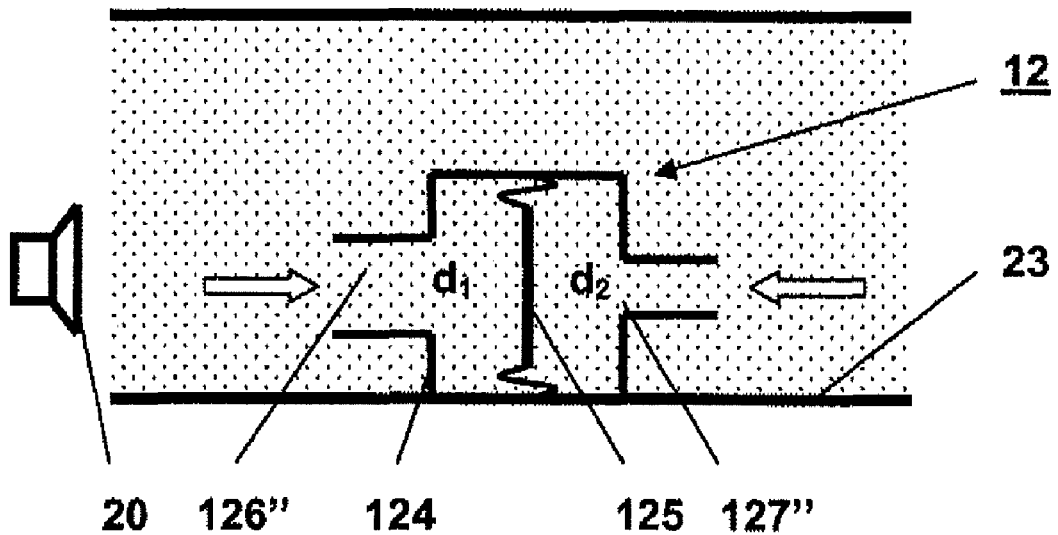
FIG. 4 shows an outline side view of an exemplary measurement device for diagnosis of noise in fluidic systems, according to a third exemplary embodiment.

FIG. 4 shows an outline side view of an exemplary measurement device for diagnosis of noise in fluidic systems, according to a third exemplary embodiment. As shown in FIG. 4, the tubular microphone housing 124" is designed to have a smaller diameter $d_2<d_1$ on the side of the second opening 127" than on the side of the first opening 126", in order to achieve the propagation time delay, with the sound being attenuated at the same time.

Figure 5:
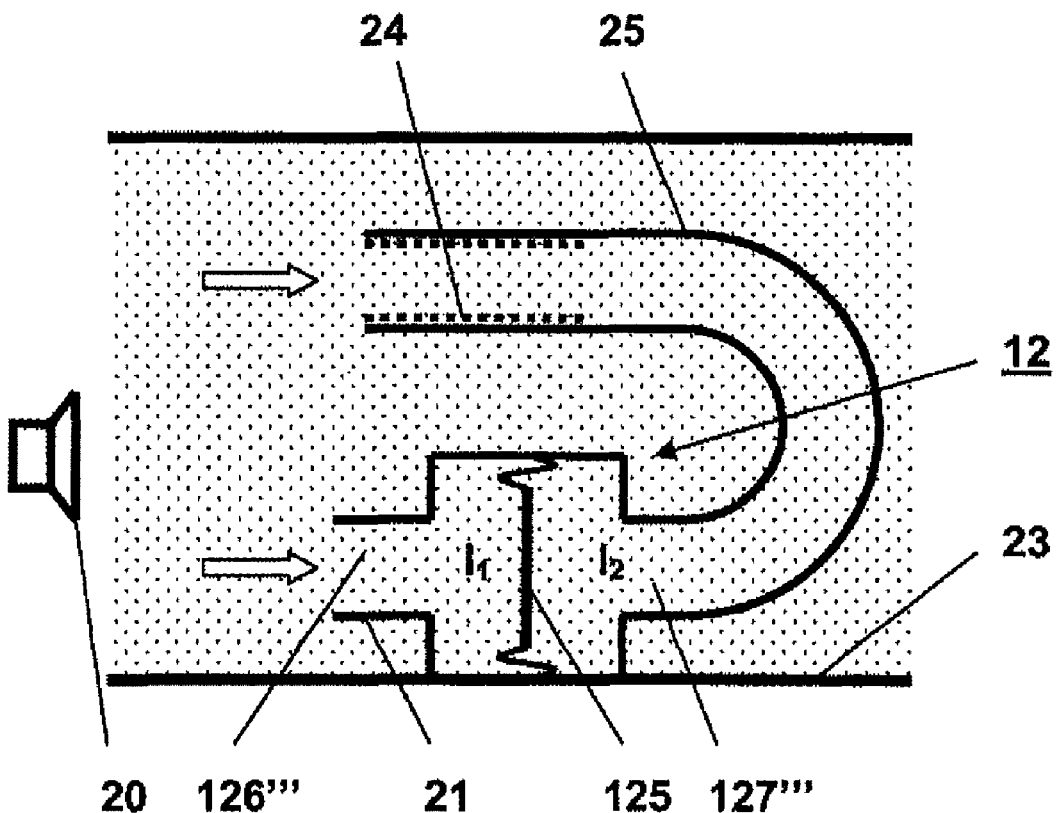
FIG. 5 shows an outline side view of an exemplary measurement device for diagnosis of noise in fluidic systems, according to another exemplary embodiment.

FIG. 5 shows an outline side view of an exemplary measurement device for diagnosis of noise in fluidic systems, according to another exemplary embodiment. According to the exemplary embodiment shown in FIG. 5, the filter means is constituted by respective channels 21 and 25, which are positioned upstream of the respective openings 126''' and 127''' and have different lengths. The channel 25 is many times longer $l_1<l_2$ than the channel 21, is bent in a U-shape, and is aligned in the direction of the sound source 20. In addition, the long channel 25 is provided with soft wall cladding 24, in order to amplify the filter effect.

The present disclosure is not restricted to the exemplary embodiment described above. Rather, modifications thereof may also be covered by the scope of protection of the following claims. For example, it is possible to combine two or more of the above-mentioned exemplary embodiments with one another, in whole or in part, to achieve adequate attenuation and/or an adequate time delay of the frequencies which are in the noise spectrum at the microphone, with a compact design.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Process valve
3 Valve seat
4 Closure body
5 Process medium
6 Actuating drive
7 Valve rod
8 Yoke
9 Position regulator
10 Position sensor
11 Fieldbus interface
12 Microphone
124 Microphone housing
125 Membrane
126, 127 Opening
128 Filter element
13 Acoustic measurement signal
14 Diagnosis unit
15 Signal detection device
16 Signal processing device
17 Memory device
18 Regulation unit
19 Pressure medium supply
20 Sound source
21, 25 Channel
22 Flow medium
23 Pipeline
24 Wall cladding

What is claimed is:

1. A measurement device for diagnosis of noise in fluidic systems, comprising:
a microphone, which is arranged at least partially in the area of a flow medium and is configured to receive noise via a membrane and convert the received noise to an electrical signal,
wherein the microphone comprises a housing which has openings on two opposite sides of the membrane, the two openings of the membrane being configured to have pressure applied thereto by the flow medium as a sound source, and
wherein at least one of the two openings comprises, to detect noise, filter means for at least one of attenuation and time delay of frequencies which are equal to or greater than a threshold value, and for permitting frequencies which are below the threshold value to pass through the filter means.

2. The measurement device as claimed in claim 1, wherein, on one of the opposite sides of the membrane, the filter means produce a time delay for the frequencies which are equal to or greater than the threshold value, by a phase shift with respect to the other side of the membrane.

3. The measurement device as claimed in claim 1, wherein the filter means are constituted by a first one of the openings being aligned in the microphone housing toward a sound source, and a second one of the openings arranged opposite to the first one of the openings being aligned in to cause at least one of a propagation time delay and attenuation of the sound on the side of the membrane which is associated with the second opening.

4. The measurement device as claimed in claim 3, wherein the housing has a tubular arrangement, and the housing is configured to be longer on the side of the membrane associated with the second opening than on the side of the membrane associated with the first opening, to achieve the at least one of the propagation time delay and the attenuation of the sound.

5. The measurement device as claimed in claim 4, wherein the tubular microphone housing is additionally lengthened by an upstream tube or channel on the side of the first opening in comparison to the microphone housing on the side of the second opening, to achieve the at least one of the propagation time delay and the attenuation of the sound.

6. The measurement device as claimed in claim 1, wherein the filter means is constituted by a diameter difference in the openings, in that the diameter of one of the openings is less than the diameter of the other one of the openings.

7. The measurement device as claimed in claim 1, wherein the filter means are constituted by channels of different length, which are positioned upstream of the respective openings.

8. The measurement device as claimed in claim 1, wherein the filter means comprise a soft wall cladding on a wall of one of two channels respectively in contact with the two openings of the housing.

9. The measurement device as claimed in claim 1, wherein the filter means is constituted by a sound attenuator element inserted into one of the two openings.

10. A method for diagnosis of noise in fluidic systems, comprising:
arranging a microphone having a membrane and two openings on opposite sides of the membrane at least partially in the area of a flow medium;

detecting pressure applied to the openings of the membrane by the flow medium as a sound source, and creating oscillations in the membrane in accordance with the detected pressure;

converting oscillations of the membrane of the microphone to an electrical signal;

at least one of attenuating and time delaying frequencies which are equal to or greater than a threshold value, to detect noise in the flow medium; and permitting frequencies which are below the threshold value to pass, to compensate for pressure surges in the flow medium.

11. The measurement device as claimed in claim 1, wherein the noise propagates as a function of at least one of the flow of the flow medium and by transmission from an exterior source to the flow medium.

12. The measurement device as claimed in claim 1, comprising an electronic diagnosis unit configured to determine a source of the noise by evaluating the electrical signal converted by the microphone.

13. The measurement device as claimed in claim 1, wherein frequencies equal to or greater than the threshold value are in an expected noise spectrum including frequencies produced by pressure fluctuations in the flow medium.

14. The measurement device as claimed in claim 13, wherein the frequencies in the expected noise spectrum are greater than the frequencies passing through the filter means.

15. The measurement device as claimed in claim 13, wherein the frequencies passing through the filter means are produced by pressure fluctuations in the flow medium.

16. The measurement device as claimed in claim 15, wherein by passing frequencies produced by pressure fluctuations in the flow medium, the microphone is configured to compensate for pressure surges in the flow medium while simultaneously detecting noise in the expected noise spectrum.

17. The measurement device as claimed in claim 13, wherein on one of the opposite sides of the membrane, the filter means produce a time delay for the frequencies which are equal to or greater than the expected noise spectrum, by a phase shift with respect to the other side of the membrane.

18. The measurement device as claimed in claim 6, wherein the opening through which the frequencies below the threshold value pass has a diameter smaller than the diameter of the opposite opening.

19. The method of claim 10, wherein the noise propagates as a function of at least one of the flow of the flow medium and by transmission from an exterior source to the flow medium.

20. The method of claim 11, wherein frequencies equal to or greater than the threshold value are in an expected noise spectrum including frequencies produced by pressure fluctuations in the flow medium, and wherein the frequencies passing through are produced by pressure fluctuations in the flow medium.

* * * * *